United States Patent [19]
Inoue

[11] 3,750,520
[45] Aug. 7, 1973

[54] COMBINATION OF MUSICAL BOX AND ODOMETER FOR A BICYCLE

[75] Inventor: Shiro Inoue, Ageo City, Saitama Prefecture, Japan

[73] Assignee: Kabushiki Kaishya Inoue Seisakushyo, Kashiwaza, Ageo City, Saitama Prefecture, Japan

[22] Filed: Apr. 13, 1972

[21] Appl. No.: 243,579

[52] U.S. Cl. ............................................. 84/94
[51] Int. Cl. .............................................. G10f 1/06
[58] Field of Search ................................ 84/94, 95

[56] References Cited
UNITED STATES PATENTS
2,619,931  12/1952  Mueller ............................. 84/94 X FOREIGN PATENTS OR APPLICATIONS
919,753  9/1954  Germany ............................. 84/94

Primary Examiner—Richard B. Wilkinson
Assistant Examiner—Lawrence R. Franklin
Attorney—Charles E. Temko

[57] ABSTRACT

An odometer for a bicycle and a musical box are placed in the same casing and are driven by the same power source.

1 Claim, 3 Drawing Figures

Patented Aug. 7, 1973 3,750,520

COMBINATION OF MUSICAL BOX AND ODOMETER FOR A BICYCLE

An odometer for a bicycle has been well known. It is usually attached to the handle bar of a bicycle and driven by the rotation of a wheel through a flexible shaft. It shows only the distance that the bicycle runs.

This invention relates to an odometer for a bicycle combined with a musical box. Said odometer and musical box are driven simultaneously by the common power source. So while driving a bicycle, a rider can read the odometer as well as hear music played by the musical box. It is not only pleasant to ears but also enables him to judge the speed of the bicycle by the quickness of musical tempo.

This invention will be understood from the following description.

Figure 1:
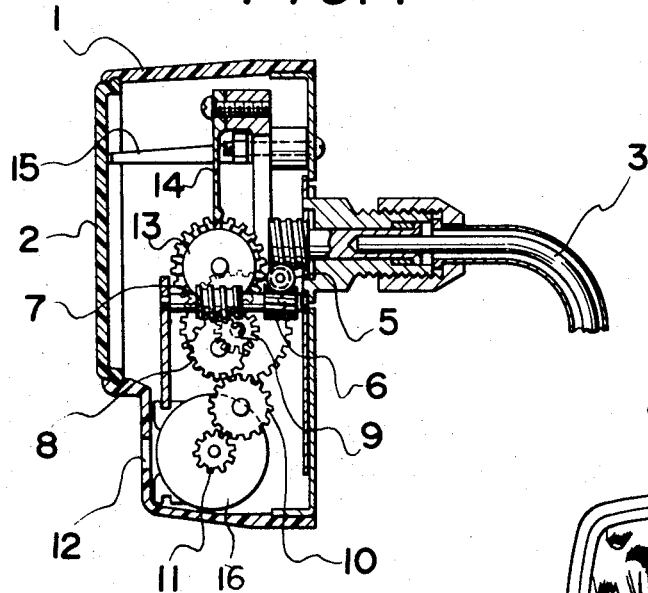
FIG. 1 is a sectional view of the apparatus according to this invention.
Figure 2:
FIG. 2 shows a front view.
Figure 3:
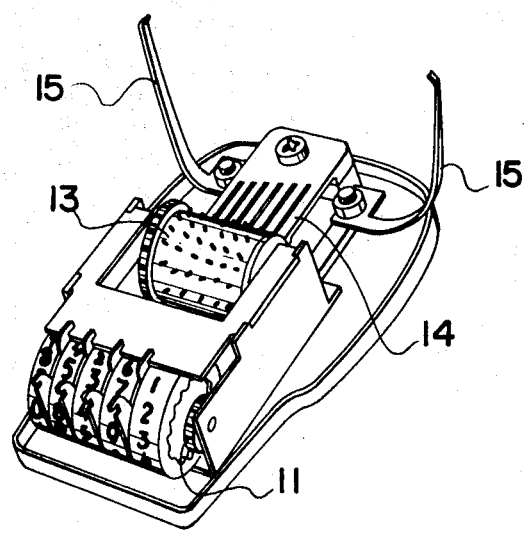
FIG. 3 is a perspective view of the odometer and musical box.

Referring to the drawings, numeral 1 is a casing, 2 is a front panel on which a picture may be painted as shown in FIG. 2 for decorative purpose, 3 is a flexible shaft for transmitting rotation from a wheel of the bicycle to odometer 16 as well as musical box through gearing 5,6,7,8,9,10 and 11. 12 is an opening provided in the casing for showing figures of odometer wheels. 13 is a rotating drum having a number of pins around its periphery. 14 is a reed co-operating with said pins. The mechanism and function of the musical box being old and well known, no detail is given here. 15 are sound transmitters of thin and resilient metal the ends of which being always in contact with the front panel 2 or other inner wall portion of the casing 1 for amplifying the sounds. Without such sound transmitting means, the music sounds generated by the musical box are hardly audible on the outside.

As is clear from the above, while the bicycle is running, the rider can read the odometer as well as hear the music played by the musical box. It is not only pleasant to ears but also enables the rider to judge the speed of the bicycle, because the greater the speed of the bicycle is, the quicker the tempo of music becomes.

I claim:

1. A combination speedometer-odometer for a bicycle comprising: a casing; a music box enclosed in said casing for providing an indication of the speed of said bicycle; an odometer enclosed in said casing for providing an indication of distance traveled by said bicycle; and drive means responsive to the motion of said bicycle for driving both said music box and said odometer.

* * * * *